(12) United States Patent
Shimazu

(10) Patent No.: US 10,070,226 B2
(45) Date of Patent: Sep. 4, 2018

(54) SPEAKER DEVICE

(71) Applicant: Yamaha Corporation, Hamamatsu-shi, Shizuoka-ken (JP)

(72) Inventor: Takamori Shimazu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/609,966

(22) Filed: May 31, 2017

(65) Prior Publication Data
US 2017/0265004 A1    Sep. 14, 2017

Related U.S. Application Data

(63) Continuation of application No. PCT/JP2015/083722, filed on Dec. 1, 2015.

(30) Foreign Application Priority Data

Dec. 1, 2014   (JP) ................................. 2014-243297

(51) Int. Cl.
    *H04R 5/02*     (2006.01)
    *H04R 5/04*     (2006.01)
    *G08C 23/04*    (2006.01)

(52) U.S. Cl.
    CPC .............. *H04R 5/04* (2013.01); *G08C 23/04* (2013.01); *H04R 5/02* (2013.01)

(58) Field of Classification Search
    USPC ....... 381/17, 74, 77, 172, 300, 387, 87, 386, 381/322, 355
    See application file for complete search history.

(56) References Cited

U.S. PATENT DOCUMENTS

| | | | | |
|---|---|---|---|---|
| 7,072,475 B1 * | 7/2006 | DeNap | ................... | H04B 1/385 381/172 |
| 2003/0201406 A1 * | 10/2003 | Trzecieski | ............. | G01B 11/26 250/559.3 |

(Continued)

FOREIGN PATENT DOCUMENTS

| JP | 8-182098 A | 7/1996 |
|---|---|---|
| JP | 2014-514856 A | 6/2014 |

(Continued)

OTHER PUBLICATIONS

International Search Report (PCT/ISA/210) issued in PCT Application No. PCT/JP2015/083722 dated Mar. 1, 2016 with English translation (five (5) pages).

(Continued)

*Primary Examiner* — Yosef K Laekemariam
(74) *Attorney, Agent, or Firm* — Crowell & Moring LLP

(57) ABSTRACT

Provided is a speaker device including a cabinet whose direction is changed in accordance with an installation state, and capable of detecting the direction of the device based on received optical signals. The speaker device can be installed in a state in which the speaker device is placed on a rack such that a receiving unit faces a listening position, and a state in which the speaker device is hung on a wall such that a receiving unit faces the listening position. Voltage converting units are configured to convert photocurrents output by light receiving elements according to received light amounts of an infrared ray from an infrared remote controller to voltage signals to output the signals to a controller. The controller compares amplitudes of the voltage signals to each other, thereby detecting a state (direction) of the speaker device.

9 Claims, 5 Drawing Sheets

(56) References Cited

U.S. PATENT DOCUMENTS

| | | | |
|---|---|---|---|
| 2012/0039476 A1* | 2/2012 | Cha | H04R 1/26 |
| | | | 381/17 |
| 2012/0263324 A1 | 10/2012 | Joyce et al. | |
| 2012/0263325 A1 | 10/2012 | Freeman et al. | |
| 2012/0263335 A1 | 10/2012 | Breen et al. | |
| 2014/0205133 A1 | 7/2014 | Freeman et al. | |
| 2015/0208162 A1 | 7/2015 | Freeman et al. | |
| 2015/0350773 A1* | 12/2015 | Yang | H04N 21/43615 |
| | | | 381/77 |
| 2016/0119735 A1 | 4/2016 | Freeman et al. | |

FOREIGN PATENT DOCUMENTS

| | | |
|---|---|---|
| JP | 5582668 B2 | 9/2014 |
| WO | WO 2012/142357 A1 | 10/2012 |

OTHER PUBLICATIONS

Japanese Written Opinion (PCT/ISA/210) issued in PCT Application No. PCT/JP2015/083722 dated Mar. 1, 2016 (three (3) pages).
Japanese-language Office Action issued in counterpart Japanese Application No. 2014-243297 dated Jul. 3, 2018 with English translation (five (5)pages).

* cited by examiner

SPEAKER DEVICE

CROSS-REFERENCE TO RELATED APPLICATION

This application is a continuation of PCT International Application No. PCT/JP2015/083722, filed Dec. 1, 2015, which claims priority under 35 U.S.C. § 119 from Japanese Patent Application JP2014-243297, filed Dec. 1, 2014, the entire disclosure of which are herein expressly incorporated by reference in its entirety.

BACKGROUND

Previously, there has been a so-called "sound bar" which incorporates a plurality of speaker units in an elongate cabinet (e.g., JP 5582668 B2). A sound bar and other such speaker devices are connected to a television set to use. In order to address a reduction in thickness and an increase in size of the television set in recent years, due to design reasons, constraints of installation space, and other such reasons, this type of speaker device is also required to be reduced in thickness. As a result, due to the reduction in thickness, in the speaker device, it has become difficult to arrange multi-way speaker units to the same surface. The speaker device disclosed in Patent Literature 1 includes a cabinet having a rectangular parallelepiped shape which is long in one direction, and speaker units are provided to adjacent two surfaces (in the document, surface 111 and surface 112) of a plurality of surfaces provided to the cabinet. The speaker device rotates by 90 degrees about a longitudinal direction of the cabinet as an axial direction, and the direction of installation of the device is changed between, for example, a state in which the device is hung on a wall to use and a state in which the device is placed on a rack or the like to use.

Incidentally, in the above-mentioned speaker device, the direction of the speaker units is different between the case in which the speaker device is hung on a wall to use and the case in which the speaker device is placed on a rack or the like to use, and thus the speaker device includes a device configured to detect the direction of the cabinet in order to change a control content in accordance with the direction. For example, in the above-mentioned patent literature, there is disclosed a technology of using a gravity detector as a method of detecting the direction of the cabinet. However, for example, when a gravity detection element, for example, a gyro sensor, is provided, this method requires an oscillation circuit and the like for driving the gyro sensor, and there is a fear for an increase in complexity of the structure.

A technology disclosed in this application is proposed in view of the above-mentioned problem. For example, the present, invention has an object to provide a receiving device including a cabinet whose direction is changed in accordance with an installation state, and being capable of detecting the direction of the device based on optical signals received by a plurality of light receiving elements, and a speaker device including the receiving device.

SUMMARY

A speaker device according to the technology disclosed in this application includes: a first speaker unit configured to emit sound in accordance with an acoustic signal that is input thereto; a second speaker unit that has a sound emission direction different from a sound emission direction of the first speaker unit and a large diameter as compared to the first speaker unit, and is configured to receive an acoustic signal including a frequency band of the acoustic signal input to the first speaker unit; a first light receiving element configured to output a first photocurrent in accordance with a received optical signal; a second light receiving element which is different in a set light receiving direction from the first light receiving element, and is configured to output a second photocurrent in accordance with a received optical signal; a cabinet to which the first light receiving element, the second light receiving element, the first speaker unit, and the second speaker unit are provided, the cabinet being installable in two states including a first state in which the light receiving direction of the first light receiving element is directed to an operation position and a second state in which the light receiving direction of the second light receiving element is directed to the operation position; and a control unit configured to detect whether the cabinet is in the first state or the second state in accordance with the first photocurrent and the second photocurrent, in which the cabinet is configured such that the sound emission direction of the first speaker unit is directed to a listening position in the first state, and the sound emission direction of the second speaker unit is directed to the listening position in the second state.

DETAILED DESCRIPTION

Figure 1:
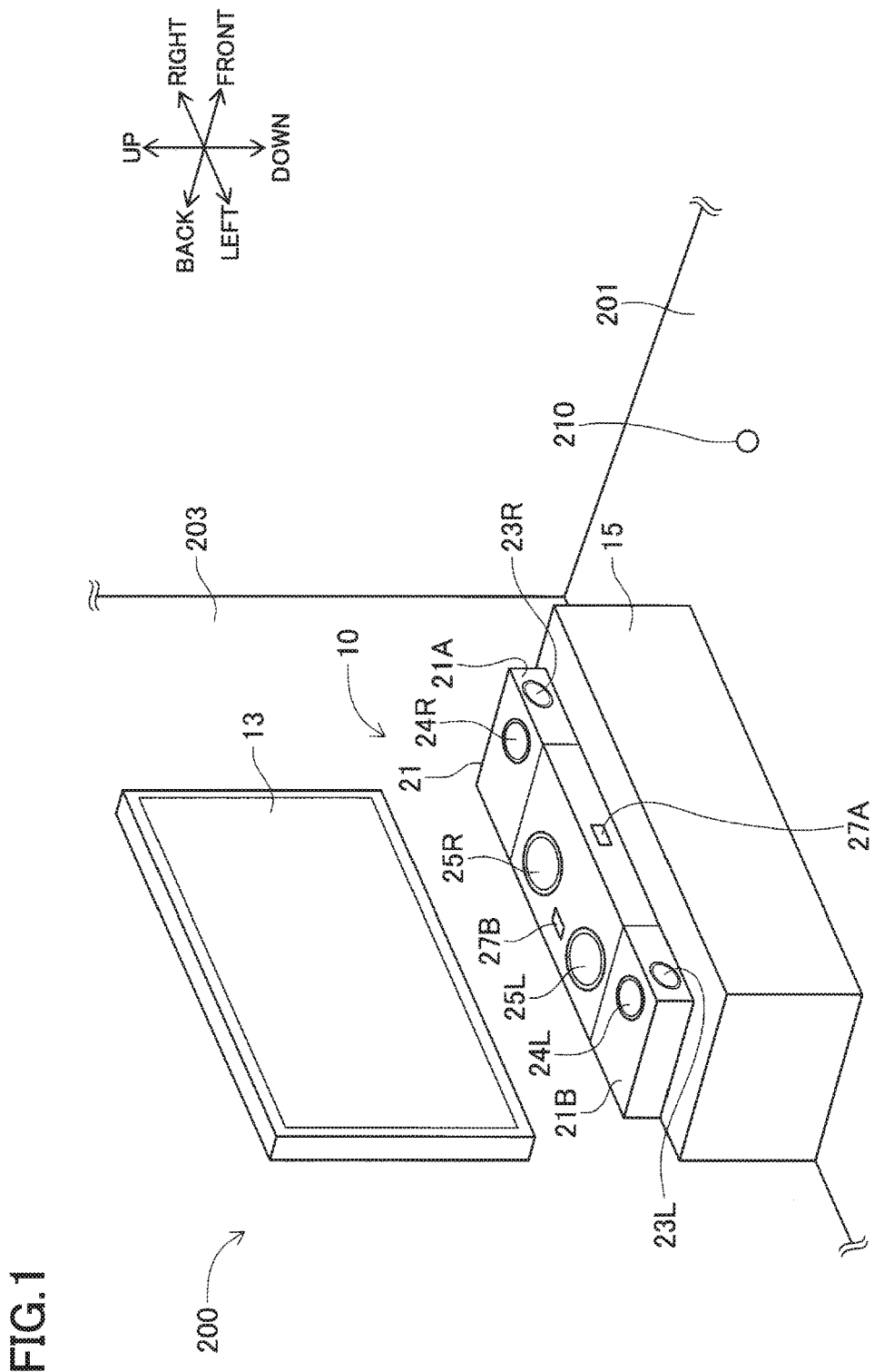
FIG. 1 A perspective view for illustrating a state in which a speaker device according to an embodiment of the present invention is arranged on a rack in a room.

Now, one embodiment for embodying the present invention is described with reference to the accompanying drawings. FIG. 1 is a perspective view for illustrating a room 200 in which a speaker device 10, which is one embodiment of the invention of the subject application, a television set 13, which is connected to the speaker device 10, and a rack 15, on which the speaker device 10 is placed, are installed. In the following description, as illustrated in FIG. 1, the description is given with a direction perpendicular to a floor 201 of the room 200 being defined as an up and down direction, a direction from the speaker device 10 toward a listening position 210 being defined as a front direction, and a direction toward the left and right of the speaker device 10 when viewed from the listening position 210 being defined as a left and right direction.

As illustrated in FIG. 1, the television set 13 is mounted along a wall 203. The rack 15 is arranged below the television set 13 and on the floor 201 in a state in which a rear surface thereof is placed along the wall 203. The speaker device 10 is placed on the rack 15, and is located below the television set 13. The speaker device 10 and the television set 13 are connected to each other via a cable connected to a High Definition Multimedia Interface (HDMI) (trademark) terminal (see FIG. 3), for example, and are capable of reproducing audio and video in synchronization with each other.

Figure 2:
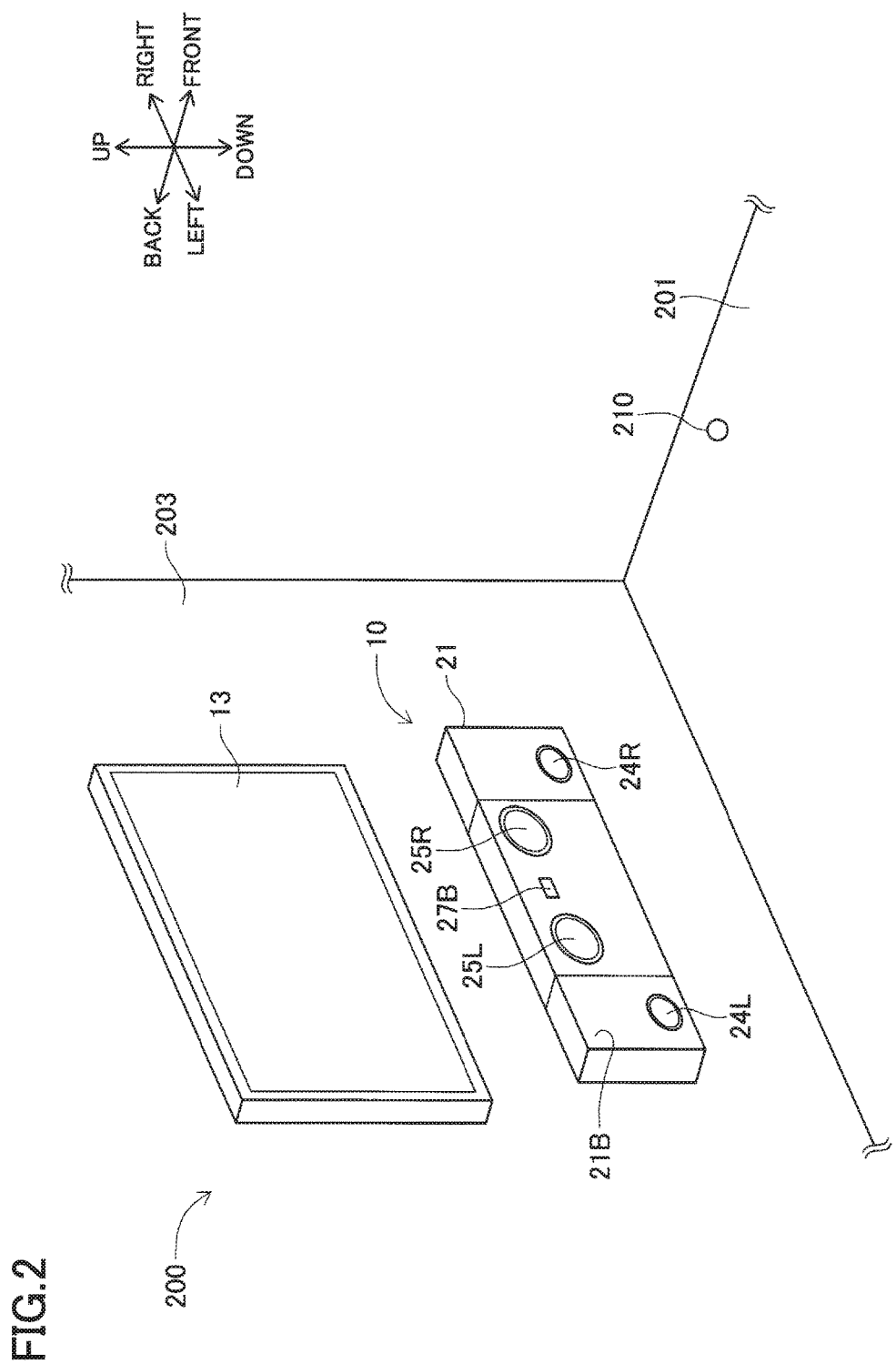
FIG. 2 A perspective view for illustrating a state in which the speaker device according to the embodiment is hung on a wall in the room.

The speaker device 10 is long in one direction (in the figures, left and right direction), and has a casing 21 having a rectangular parallelepiped shape, which has a long width in a front and back direction as compared to a width in the up and down direction. The casing 21 has a total of six speaker units mounted thereto, and of adjacent surfaces 21A and 21B (in the figures, front surface and top surface), two first speaker units 23 are mounted to the surface 21A, and two second speaker units 24 and two third speaker units 25 are mounted to the surface 21B. The speaker device 10 stores, in a memory 55 (see FIG. 3), music input from acoustic cables connected to a personal computer, an external hard disk drive, or the like in addition to the television set 13 illustrated in FIG. 1, and music input via a network or the like, for example, and reproduces the stored music from the built-in speaker units 23 to 25. The speaker device 10 according to this embodiment is a device that can be used by changing an orientation of the casing 21 as illustrated in FIG. 2, which is to be described later.

In the state illustrated in FIG. 1, the speaker device 10 has the two first speaker units 23 mounted to the front surface 21A facing the listening position 210 side. The two first speaker units 23 have similar structures, but when distinguished for the description, are described with letters suffixed to the reference numerals, such as a first speaker unit 23L (left) and a first speaker unit 23R (right), as illustrated in FIG. 1. The same applies to the other second speaker units 24L and 24R and third speaker units 25L and 25R.

In the state illustrated in FIG. 1, the surface 21A is in a state in which its plane is aligned with the up and down direction and the left and right direction. The casing 21 has the first speaker unit 23L mounted to a left end portion of the surface 21A, and the first speaker unit 23R mounted to a right end portion of the surface 21A. The two first speaker units 23L and 23R are both in a state of facing the listening position 210.

Moreover, the first speaker units 23 have a small diameter as compared to the other second and third speaker units 24 and 25. The term "diameter" as used herein refers to a diameter of a cone-shaped diaphragm, for example. Moreover, the first and second speaker units 23 and 24 in this embodiment have similar structures as full-range speakers, though with the different diameters. In general, a speaker unit is good at reproducing a higher frequency band as the diameter becomes smaller, and is good at reproducing a lower frequency band as the diameter becomes larger. Therefore, the first speaker units 23 have the structure having the small diameter and being good at reproducing the high frequency band as compared to the second speaker units 24. For example, the first speaker units 23 function as tweeters, which are optimized for outputting a sound having a higher frequency in an audible frequency range.

In the state illustrated in FIG. 1, the surface 21B faces upward, and is in a state in which its plane is aligned with the front and back direction and the left and right direction. The casing 21 has the second speaker unit 24L mounted to a left end portion of the surface 21B, and the second speaker unit 24R mounted to a right end portion of the surface 21B. The second speaker units 24 are in a state of facing an upward direction, which is orthogonal to the direction of the first speaker units 23. The second speaker units 24 have the structure having a large diameter as compared to the first speaker units 23, and a small diameter as compared to the third speaker units 25, and being good at reproducing an intermediate frequency band. For example, the second speaker units 24 function as woofers, which are optimized for outputting a sound having a frequency in an intermediate frequency band in the audible frequency range.

Moreover, the third speaker units 25 are mounted to the surface 21B. The casing 21 has, in the left and right direction, the third speaker unit 25L mounted to an inner portion with respect to the second speaker unit 24L, and the third speaker unit 25R mounted to an inner portion with respect to the second speaker unit 24R. As with the second speaker units 24, the third speaker units 25 are in a state of facing the upward direction. The third speaker units 25 have the structure having a large diameter as compared to the first and second speaker units 23 and 24, and being good at reproducing an even lower frequency band, and function as subwoofers.

As described above, the speaker device 10 includes the six speakers (that is, the first speaker units 23 and the like) that are provided on the both sides in the left and right direction in the case 21 extending in the left and right direction with respect to the listening position 210, thereby emitting sound having a feeling of spreading in the left and right direction (horizontal direction) for a listener 220 (refer to FIG. 3) at the listening position 210.

Moreover, the speaker device 10 includes two receiving units 27A and 27B, which are configured to receive an infrared ray from an infrared remote controller 230 (see FIG. 3) included with the speaker device 10. The receiving unit 27A is provided at a center-portion of the surface 21A in the left and right direction. The receiving unit 27B is provided at a center portion of the surface 21B in the left and right direction, and at a position on the rear side between the third speaker units 25. In the state illustrated in FIG. 1, the receiving unit 27A is in a state of facing the listening position 210 side (front direction), and the receiving unit 27B is in a state of facing upward.

In FIG. 2, there is illustrated a state of installation after changing an orientation in which the speaker device 10 is installed. In the state illustrated in FIG. 2, the speaker device 10 is in a state in which the orientation of the casing 21 is rotated by 90° about an axis along the left and right direction (longitudinal direction of the casing 21) such that the surface 21B faces the listening position 210 side. As with the television set 13, the speaker device 10 is mounted on the wall 203 with a mounting member (not shown). In the state illustrated in FIG. 2, the speaker device 10 is in a state in which the second and third speaker units 24 and 25 face the listening position 210. Moreover, of the receiving units 27A and 27B, the receiving unit 27B is in a state of facing the listening position 210 side. The speaker device 10 is in a state in which the surface 21A (see FIG. 1) faces downward, and the first speaker units 23 and the receiving unit 27A face the floor 201.

The speaker device 10 according to this embodiment reproduces audio from all the speaker units 23 to 25 without switching inputs of acoustic signals to the first to third speaker units 23 to 25 in any one of the states of FIG. 1 and FIG. 2. Here, the first to third speaker units 23 to 25 have mutually different diameters, and hence different directivities of the emitted sounds. A speaker unit generally has a higher directivity as the diameter becomes smaller. The state illustrated in FIG. 1 and the state illustrated in FIG. 2 are different in directions of the first to third speaker units 23 to 25, which have such directivities, with respect to the listening position 210, and hence dominant speaker units, which form a sound field at the listening position 210, are changed. For example, in the state illustrated in FIG. 1, the first speaker unit 23 facing the listening position 210 is dominant as compared to the other speaker units 24 and 25, and hence has a larger effect on the sound heard by the ears of a listener 220 (see FIG. 3). Therefore, even when the same music is reproduced, the sound quality at the listening position 210 is varied between the states of FIG. 1 and FIG. 2, which is a problem. To address this problem, the speaker device 10 according to this embodiment performs processing of suppressing variations in sound quality at the listening position 210, which are caused by such difference in orientation of the installation. As a result, when the orientation of the installation is changed, the speaker device 10 achieves the reproduction of the audio suppressing the variations in sound quality while outputting from all the speaker units 23 to 25, instead of switching the speaker units to output.

Figure 3:
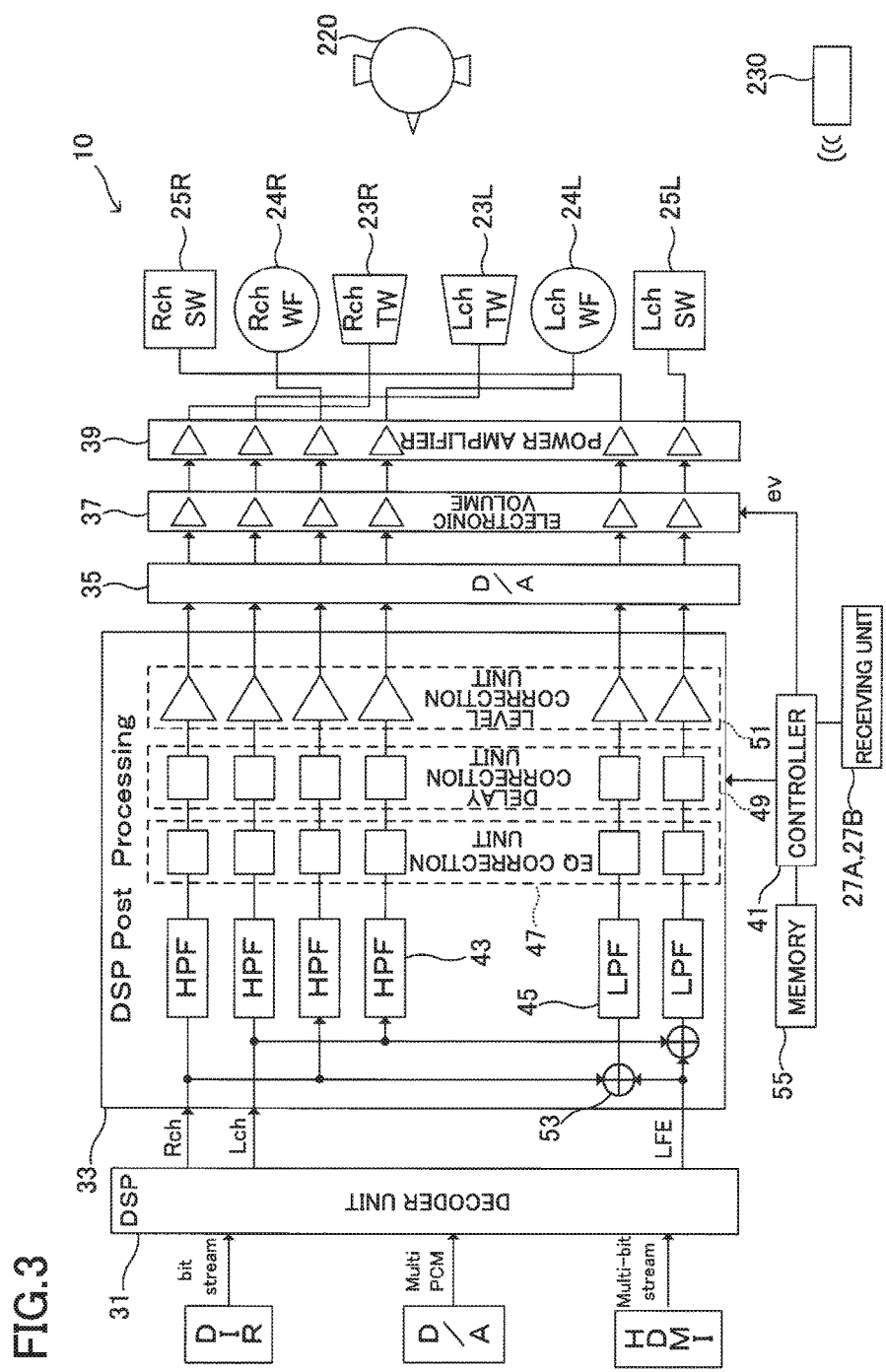
FIG. 3 A block diagram for illustrating a configuration of the speaker device.

FIG. 3 is a block diagram for illustrating a configuration of the speaker device 10. As illustrated in FIG. 3, the speaker device 10 includes a decoder unit 31, a post-processing unit 33, a D/A converter 35, an electronic volume 37, a power amplifier (power amplification circuit) 39, a controller 41 configured to perform centralized control on those components, and the like. The decoder unit 31 and the post-processing unit 33 are achieved by a digital signal processor (DSP), for example.

The decoder unit 31 receives acoustic signals from, a DVD player, a Super Audio CD player, or other such digital audio equipment in addition to the television set 13, and outputs, for example, multi-channel signals having 2.1 channels. The decoder unit 31 receives a bitstream signal from a digital interface receiver (DIR), a multi-channel PCM signal from the D/A converter, and a multi-channel bitstream signal from the High Definition Multimedia Interface (HDMI) (trademark) terminal, for example, and decompresses data compressed with Dolby Digital, Digital Theater Systems (DTS), Advanced Audio Coding (AAC), or other such standards. The decoder unit 31 output a 2.1-channel signal including, in addition to a left (L) channel and a right (R) channel, a low tone (LFE) channel containing large components in a low frequency band. The post-processing unit 33 includes four high-pass filters 43, two low-pass filters 45, an equalizer correction unit 47, a delay correction unit 49, a level correction unit 51, and the like. The post-processing unit 33 outputs two stereo channel (L and R) signals input from, the decoder unit 31 to the equalizer correction unit 47 via the high-pass filters 43 corresponding to the left and the right of each of the first and second speaker units 23 and 24. The high-pass filters 43 attenuate components in a frequency band that is a predetermined cutoff frequency or less, and selectively allow frequency band components corresponding to reproduction frequency bands of the first and second speaker units 23 and 24 to pass therethrough. The cutoff frequency of the high-pass filters 43 is 100 Hz, for example. Therefore, the speaker device 10 according to this embodiment receive the acoustic signals having the same frequency band (for example, intermediate frequency band or more) input, to the first speaker units 23 and the second speaker units 24 having different diameters and sound emission directions.

Moreover, in the post-processing unit 33, the two channel (L and R) signals and the low tone (LFE) channel signal, which are input from the decoder unit 31, are input to adders 53 corresponding to the left and the right of the third speaker units 25, respectively. One adder 53 adds the LFE channel signal and the L channel signal and outputs the result, to a low-pass filter 45, as a left output signal to be output from the third speaker unit 25L. Moreover, another adder 53 adds the LFE channel signal and the R channel signal, and outputs the result, to the low-pass filters 45, as a right output signal to be output, from the third speaker unit 25R. The low-pass filters 45 attenuate components in a frequency band that is a predetermined cutoff frequency or more, and selectively output, to the equalizer correction unit 47, a frequency band component corresponding to a reproduction frequency band of the third speaker units 25.

The equalizer correction unit 47 corrects a difference between frequency characteristics of the first and second speaker units 23 and 24, which are good at different frequency bands because of the difference between the diameters. The first speaker units 23 have a relatively small diameter, and hence are good at reproducing audio in the high frequency band as compared to the second speaker units 24. Reproduction of the intermediate frequency band is complemented by the second speaker units 24.

Moreover, as described above, between the states illustrated in FIG. 1 and FIG. 2, the dominant speaker units are changed. For example, in the state illustrated in FIG. 1, the effects of the first speaker units 23, that is, the effects of the audio in the higher frequency band is larger for the ears of the listener 220. The second speaker units 24 receive the acoustic signals having the same frequency band as that of the first speaker units 23. Therefore, the equalizer correction unit 47 performs, on the acoustic signals input to the second speaker units 24, processing of emphasizing an intermediate frequency band, which the first speaker units 23 are not good at, for example. Alternatively, the equalizer correction unit 47 performs, on the acoustic signals input to the dominant first speaker units 23, processing of attenuating a high frequency band, for example. In this manner, the equalizer correction unit 47 performs processing for complementing a frequency band that is short as the audio to be supplied to the listening position 210, or suppressing a frequency band that is supplied excessively by emphasizing or attenuating the frequency band which the first and second speaker units 23 and 24 are good at or not good at.

Moreover, in the case illustrated in FIG. 2, the equalizer correction unit 47 performs processing opposite to the case illustrated in FIG. 1. Specifically, the equalizer correction unit 47 performs, on the acoustic signals input to the first speaker units 23, processing of emphasizing the high frequency band, which the second speaker units 24 are not good at, and performs, on the acoustic signals input to the second speaker units 24, processing of attenuating the intermediate frequency band, for example. In the case where the acoustic signals input to the third speaker units 25 contain parts overlapping with the frequency bands of the acoustic signals input to the first and second speaker units 23 and 24, and in other such cases, the equalizer correction unit 47 may perform similar processing also on the acoustic signals input to the third speaker units 25.

The delay correction unit 49 corrects a delay of the audio at the listening position 210, which is changed for each of the states illustrated in FIG. 1 and FIG. 2. The sound emitted from the speaker device 10 is ideally felt by the listener 220 at the listening position 210 as if the sound comes from one point sound source in the front. However, for example, in the state illustrated in FIG. 1, the second and third speaker units 24 and 25 face upward, and a distance over which sounds are transmitted from the speaker units 24 and 25 to the listening position 210 in the room 200 is longer than a distance over which the sounds from the first speaker units 23 are transmitted. As a result, the sounds emitted from the second and third speaker units 24 and 25 are delayed before reaching the listening position 210. Similarly, in the state illustrated in FIG. 2, the sounds emitted from the first speaker units 23 are delayed because of the longer distance over which the sounds are transmitted. Therefore, the listener 220 may feel a sense of discomfort of sounds emitted from not the point sound source but a plurality of sound sources because the sounds simultaneously emitted from the respective speaker units 23 to 25 enter the ears at different timings.

Moreover, when sounds emitted from one of the first and second speaker units 23 and 24 and sounds delayed from the sounds by a predetermined period of time repeatedly reach the listening position 210, peaks and dips in the frequency characteristics are periodically generated. As a result, for example, sound in a particular frequency band in the audible frequency range may be emphasized or muffled. To address this problem, the delay correction unit 49 adds, in order to correct the delay of the sounds in each state, in the state illustrated in FIG. 1, a delay corresponding to the difference between the distances over which the sound is transmitted during a period from the timing at which the sounds are emitted from the second and third speaker units 24 and 25 to the timing at which the sounds are emitted from the first speaker units 23, for example. As a result, even when the orientation in which the speaker device 10 is installed is changed, phases of sound waves reaching the listening position 210 from the respective speaker units 23 and 24 are ideally aligned so that the feeling of the sounds coming from the point sound source may be given to the listener 220 without the sense of discomfort. The delay correction unit 49 may perform similar processing also on the acoustic signals input to the third speaker units 25.

Moreover, the first and second speaker units 23 and 24 have the different diameters, and hence have different sound pressures of the sounds to be reproduced. Therefore, in the respective states illustrated in FIG. 1 and FIG. 2, the speaker units facing the listening position 210 are changed, and hence the sound pressure levels of the sounds entering the ears of the listener 220 are also changed. The level correction unit 51 is configured to perform processing for suppressing such change in sound pressure level. More specifically, in the state illustrated in FIG. 1, the level correction unit 51 performs at least one of processing of reducing levels of the acoustic signals input to the first speaker units 23 facing the listening position 210 side, and processing of increasing levels of the acoustic signals input to the second speaker units 24, for example. Ideally, with the same volume value ev of the electronic volume 37, even when the orientation in which the speaker device 10 is installed is changed, it is preferred that the level correction unit 51 make adjustments so that the sound pressure may be the same at the listening position 210. The sound pressure level adjusted by the level correction unit 51 may be set by performing a simulation and an actual measurement in advance.

Digital acoustic signals processed by the correction units 47, 49, and 51 of the post-processing unit 33 are input to the D/A converter 35. The D/A converter 35 is configured to convert the digital acoustic signals into analog acoustic signals to output the obtained analog acoustic signals to the electronic volume 37. The electronic volume 37 is configured to adjust voltage levels of the acoustic signals with the volume value ev instructed from the controller 41.

The controller 41 is a processing circuit mainly formed of a central processing unit (CPU), for example. Each of the receiving units 27A and 27B decodes an infrared code signal transmitted from the infrared remote controller 230, and outputs a result of the decoding to the controller 41. The controller 41 increases or decreases the volume value ev of the electronic volume 37 depending on the code signal input from each of the receiving units 27A and 27B, for example.

As a result, the listener 220 may change a volume of the sound to be reproduced by operating the infrared remote controller 230. Further, the controller 41 turns the power of the speaker device 10 ON and OFF, switches a source from which the acoustic signals are input, or changes the details (e.g., set value for equalizing by the equalizer correction unit 47) of the acoustic processing based on a decoded signal, for example.

Moreover, the memory 55 included in the speaker device 10 is configured to store various kinds of data and programs for use in control by the controller 41, and stores programs executed in the DSP, e.g., the post-processing unit 33, for example.

The electronic volume 37 outputs acoustic signals having adjusted voltage values to the power amplifier 39. The power amplifier 39 is connected to the first to third speaker units 23 to 25. The power amplifier 39 is configured to amplify the input acoustic signals to be output to the first to third speaker units 23 to 25. Then, the speaker device 10 outputs a left output signal from the first speaker unit 23L, and a right output signal from the first speaker unit 23R, for example.

Figure 4:
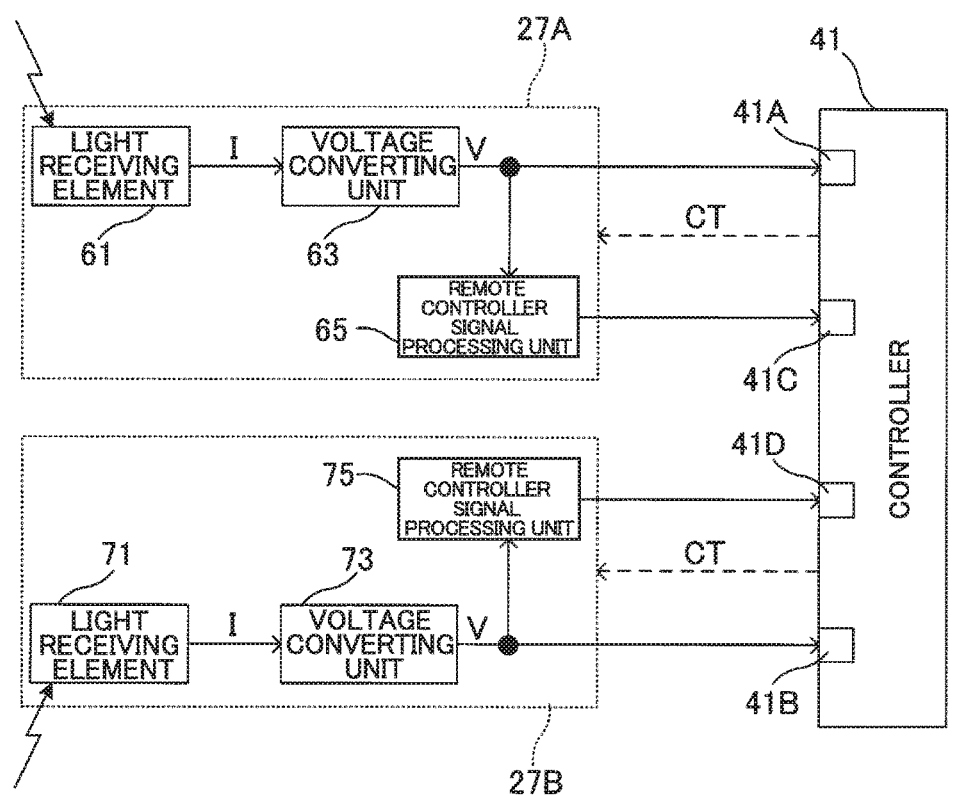
FIG. 4 A block diagram for illustrating a configuration of a receiving unit.

A description is now given of a method of detecting, by the controller 41, the direction of the case 21. The controller 41 according to this embodiment is configured to detect the direction (whether the case 21 is in the state of FIG. 1 or the state of FIG. 2) of the case 21 based on received light amounts of an infrared ray from the infrared remote controller 230, which is received by the receiving units 27A and 27B. FIG. 4 is a diagram for illustrating a configuration of the receiving units 27A and 27B. The receiving unit 21A includes a light receiving element 61, a voltage converting unit 63, and a remote controller signal processing unit 65. The receiving unit 27B includes a light receiving element 71, a voltage converting unit 73, and a remote controller signal processing unit 75. The receiving unit 27B has the same configuration as the receiving unit 21A, and thus, hereinafter, a description is mainly given of the receiving unit 27A, and a description of the receiving unit 27B is appropriately omitted.

The receiving device 61 is, for example, a photodiode, and is configured to receive the infrared ray transmitted from the infrared remote controller 230, and output a photocurrent I having an amplitude corresponding to the received light amount of the received infrared ray to the voltage converting unit 63. The light receiving element 61 is not limited to the photodiode, and may be an element capable of the photoelectric conversion, for example, a phototransistor. The voltage converting unit 63 is configured to convert the photocurrent I input from the light receiving element 61 to a voltage signal V, and output the voltage signal V after the conversion to an analog port 41A of the controller 41. Similarly, the receiving unit 27B is configured to use the voltage converting unit 73 to convert a photocurrent I output by the light receiving element 71 to a voltage signal V, and output the voltage signal V to an analog port 41B of the controller 41.

For example, in the state illustrated in FIG. 1, the receiving unit 27A faces the listening position 210 (operation position at which the listener 220 operates the infrared remote controller 230). On the other hand, the receiving unit 27B faces a ceiling, and thus faces a direction different from that toward the listening position 210 (operation position). Each of the receiving units 27A and 27B according to this embodiment has a configuration in which the photocurrent I increases in proportion to the received light amount. Therefore, when the listener 220 operates the infrared remote controller 230 at the listening position 210, the photocurrent I output from the receiving unit 27A is larger than the photocurrent I output from the receiving unit 27B. A voltage value of the voltage signal V output from the receiving unit 27A is thus larger than a voltage value of the voltage signal V output from the receiving unit 27B. When the voltage value of the voltage signal V input from the analog port 41A is larger than the voltage value of the voltage signal V input from the analog port 41B, the controller 41 determines that the speaker device 10 is in the state illustrated in FIG. 1 in which the speaker device 10 is placed on the rack 15. In other words, the change in the received light amount of the infrared ray received from the infrared remote controller 230 in accordance with the direction of the case 21 is used to detect the direction of the case 21 in the speaker device 10. When the controller 41 detects the direction of the case 21, the controller 41 carries out the setting of the contents of the audio processing by the respective correction units 47, 49, and 51 described above in accordance with the detected direction, for example.

Moreover, the voltage converting unit 63 outputs the voltage signal V after the conversion to the remote controller signal processing unit 65. The remote controller signal processing unit 65 decodes an infrared code signal transmitted from the infrared remote controller 230. The remote controller signal processing unit 65 applies amplification processing, filtering, waveform shaping processing, and the like to the voltage signal V input from the voltage converting unit 63, and then carries out decode processing to output the signal to a digital port 41C of the controller 41. Similarly, the remote controller signal processing unit 75 of the receiving unit 27B decodes the voltage signal V input from, the voltage converting unit 73 to output the signal to a digital port 41D of the controller 41. Thus, the light receiving elements 61 and 71 used to discriminate the direction of the case 21 are also used as light receiving units for receiving the remote control signal in the receiving units 27A and 27B according to this embodiment.

Moreover, after the controller 41 detects the direction of the case 21, the controller 41 controls which of the receiving units 27A and 27B out of the two receiving units 27A and 27B is used to receive the infrared ray from the infrared remote controller 230. Specifically, for example, in the state illustrated in FIG. 1, the receiving unit 27B is in the state of facing the ceiling, and is less likely to receive the infrared ray even when the listener 220 operates the infrared remote controller 230 at the listening position 210. Moreover, when the receiving unit 27B directing in the direction different from that toward the listening position 210 is functioning, the receiving unit 27B may receive an infrared ray from a light source other than the infrared remote controller 230, resulting in a detection error. Moreover, unnecessary processing and power consumption occur when the receiving unit 27B and the like that are less likely to receive the infrared ray are driven. Thus, when the controller 41 detects, for example, that the direction of the case 21 is in the state illustrated in FIG. 1, the controller 41 carries out control of disabling the receiving unit 27B. The term "disabling" used herein refers to, for example, carrying out processing of outputting a control signal CT to the receiving unit 27B, thereby stopping the power supplied to the receiving unit 27B. As a result, the controller 41 can disable the unnecessary receiving unit 27B, thereby preventing generation of defects, for example, the detection error and the unnecessary power consumption. Similarly, when the controller 41 detects that the direction of the case 21 is in the state illustrated in FIG. 2, the controller 41 carries out control of disabling the receiving unit 27A facing the floor 201.

Moreover, the controller 41 carries out the detection of the direction of the case 21 and the processing of disabling the unnecessary receiving unit 27A or 27B described above at a timing when the power of the speaker device 10 is turned on, for example. It is not conceivable that the direction of the speaker device 10 is often changed, and thus, when the detection of the direction and the like are carried out each time the infrared ray is received from the infrared ray remote controller 230, it leads to unnecessary processing. Thus, the controller 41 according to this embodiment is configured to detect the direction, and carry out the processing of disabling the unnecessary receiving unit 27A or 27B when the controller 41 receives the infrared ray from the infrared remote controller 230 for the first time after the power is turned on.

The above-mentioned execution timing is an example, and the execution may be at other timing, for example, a timing of return from a sleep state. The term "sleep state" used herein refers to, for example, a state in which unnecessary power supply is temporarily stopped, thereby suppressing the power consumption when the operation by the listener 220 is not carried out for a certain period of time. Alternatively, the controller 41 may be configured to carry out the above-mentioned processing each time the infrared ray is received.

Moreover, the controller 41 may be configured to use the processing results of the remote controller signal processing units 65 and 75 in order to determine whether or not an infrared ray received after the power is turned on is the signal from the infrared remote controller 230. For example, when the voltage signal V is input from, the analog port 41A or the like, and the decoded signal input from the remote control signal processing unit 65 or 75 does not have a valid value, the controller 41 may not carry out the detection of the direction of the case 21 and the like until the voltage signal V is input next time. As a result, it is possible to prevent such an operation error that an infrared ray generated from a light source other than the infrared remote controller 230 is received, and the direction is determined based on this infrared ray and the like.

Incidentally, the speaker device 10 is an example of a speaker device and a receiving device. The light receiving elements 61 and 71 are examples of first and second light receiving elements. The photocurrent I is an example of first and second photocurrents. The listening position 210 is an example of a listening position and an operation position. The case 21 is an example of a cabinet. The controller 41 is an example of a control unit. The remote control signal processing units 65 and 75 are examples of a signal processing unit. The listening position 210 is an example of the operation position.

With the above-mentioned embodiment, the following effects are provided. The speaker device 10 is installable in the two states including are the state (refer to FIG. 1) in which the speaker device 10 is placed on the rack 15 such that the receiving unit 27A faces the listening position 210 and the state (refer to FIG. 2) in which the speaker device 10 is hung on the wall 203 such that the receiving unit 27B faces the listening position 210. The voltage converting units 63 and 73 are configured to convert the photocurrents I output by the light receiving elements 61 and 71 in accordance with the received light amounts of the infrared ray from the infrared remote controller 230 to voltage signals V, and output the voltage signals V to the controller 41. The controller 41 is configured to compare the amplitudes of the voltage signals V input from the respective voltage converting units 63 and 73 to each other, thereby detecting the state (direction) of the speaker device 10. With this configuration, it can be expected that the overall structure of the speaker device 10 can be simplified compared to a case in which a gravity detector, for example, a gyro sensor, is used to detect the direction.

The remote controller signal processing units 65 and 75 are configured to decode the infrared code signal transmitted from the infrared remote controller 230, and input the signal to be decoded from the voltage converting units 63 and 73. In other words, the speaker device 10 is configured to use the same light receiving elements 61 and 71 both for detecting the direction of the case 21 and receiving the infrared ray from the infrared remote controller 230, and a circuit configuration is thus simplified.

When the controller 41 detects that the direction of the case 21 is in the state illustrated in FIG. 1, the controller 41 stops the power supplied to the receiving unit 27B directing upward (ceiling side). As a result, the controller 41 stops the light receiving operation of the receiving unit 27B, thereby carrying out the decrease in the power consumption and the like.

The controller 41 is configured to carry out the detection of the direction of the case 21 and the processing of disabling the unnecessary receiving unit 27A or 27B when the power is turned on, thereby more quickly applying the control optimized for the direction of the device.

The speaker device 10 has the first and second speaker units 23 and 24, which have different diameters and sound emission directions, mounted thereto. The speaker device 10 is installable in the following two states: the state of being placed on the rack 15 with the first speaker units 23 facing the listening position 210 as illustrated in FIG. 1; and the state of being hung on the wall 203 with the second speaker units 24 facing the listening position 210 as illustrated in FIG. 2. The controller 41 is configured to control the equalizer correction unit 47 in accordance with the direction of the case 21, thereby correcting frequency characteristics of the acoustic signals input to the first and second speaker units 23 and 24 so that sound quality at the listening position 210 does not change depending on differences in the diameter and the sound emission direction. As a result, variations in the sound quality at the listening position 210 caused by a change in the direction of the installation of the speaker device 10 can be suppressed.

It should be understood that the present invention is not limited to the embodiment described above, and may be subjected to various improvements and modifications without departing from the gist of the present invention.

Figure 5:
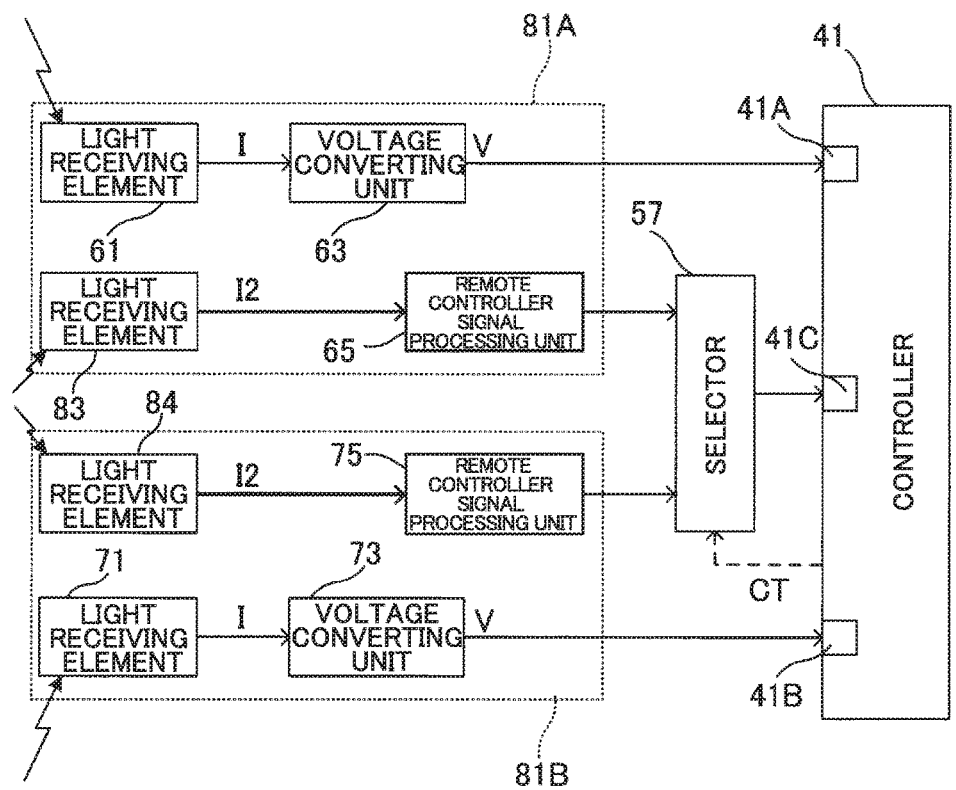
FIG. 5 A block diagram for illustrating a configuration of a receiving unit according to another example.

For example, according to this embodiment, the speaker device 10 is configured to use the same light receiving elements 61 and 71 both for detecting the direction of the case 21 and receiving the infrared ray from the infrared remote controller 230. However, the speaker device 10 may include independent light receiving elements. FIG. 5 is a diagram for illustrating the configuration of receiving units 81A and 81B according to another example. The receiving unit 81A includes a light receiving element 83 configured to output a photocurrent I2 acquired by converting the infrared ray from the infrared remote controller 230 to the remote controller signal processing unit 65. Similarly, the receiving unit 81B includes a light receiving element 84 configured to output the photocurrent I2 to the remote control signal processing unit 75. In the following, the same configurations as the above-mentioned embodiment are denoted by the same reference symbols, and a description thereof is appropriately omitted.

The light receiving element 83 and the remote control signal processing unit 65 may be molded into a package from such a view point as to prevent external noise from being superimposed on the photocurrent I2. Therefore, it is difficult to extract only the photocurrent I2 from a middle portion of the circuit in the packaged circuit. Moreover, the packaged circuit may include a circuit, for example, an automatic gain control (AGC) circuit, for automatically adjusting an output to be constant even when the amplitude of an input signal fluctuates. Therefore, when the packaged circuit is used, an adjusted output signal is output, and it is difficult to detect a received light amount from the output signal adjust to be at a certain level. Thus, when the light receiving element 83 and the remote controller signal processing unit 65 are packaged, and it is difficult to extract a necessary signal, it is effective to independently provide the light receiving elements 61 and 71 for detecting the direction of the case 21 and the light receiving elements 83 and 84 for receiving the infrared ray from the infrared remote controller 230 as illustrated in FIG. 5. In this case, the light receiving element 61 and the light receiving element 83 included in the receiving unit 81A are preferably arranged to be close to each other in order to increase detection precision. Similarly, the light receiving element 71 and the light receiving element 84 included in the receiving unit 81B are also preferably arranged to be close to each other.

Moreover, in the configuration illustrated in FIG. 5, a selector 57 is provided between the receiving units 81A and 81B and the controller 41. The remote control signal processing units 65 and 75 are configured to output the decoded signals to the selector 57. The selector 57 changes which signal out of the signals input from the remote controller signal processing units 65 and 75 is output, based on the control signal CT input from the controller 41. The signal output from the selector 57 is input to the digital port 41C of the controller 41. For example, when the voltage value of the voltage signal V input from the analog port 41A is larger than the voltage value of the voltage signal V input from the analog port 41B, the controller 41 determines that the speaker device 10 is in the state illustrated in FIG. 1, and controls the selector 57 so as to output the signal from the remote controller signal processing unit 65. Thus, the controller 41 does not stop the power supply to the unnecessary receiving unit 81A or 81B in accordance with the direction of the case 21 as in the above-mentioned embodiment. With this configuration, the controller 41 can select an appropriate signal in accordance with the direction while periodically determining the direction based on the voltage signals V input from the analog ports 41A and 41B.

Moreover, in the above-mentioned embodiment, the controller 41 is configured to detect the direction based on the voltage values of the voltage signals V, but may be configured to detect the direction based on the magnitudes of the current values of the photocurrents I output by the light receiving elements 61 and 71.

Moreover, in the above-mentioned embodiment, the speaker device 10 may include A/D conversion circuit configured to convert the analog voltage signals V output by the voltage converting units 63 and 73 to digital voltage signals. In this case, the output of the A/D conversion circuit can be input to the digital port of the controller 41.

Moreover, in the above-mentioned embodiment, a description is given of the speaker device 10 as an example of a device including the receiving device in this application, but this application may be applied to other devices configured to change control contents in accordance with an installation direction (direction).

Moreover, the speaker device 10 may include report means for reporting the detected direction of the case 21 to the listener 220. For example, such a configuration as to turn on different LEDs between the state illustrated in FIG. 1 and the state illustrated in FIG. 2 may be employed.

Moreover, infrared transmission filters configured to selectively transmit a frequency band of the infrared ray transmitted from the infrared remote controller 230 may be attached to the light receiving units of the receiving units 27A and 27B. With this, light (visible light or the like) other than the infrared ray can be prevented from entering the light receiving elements 61 and 71. As a result, the detection error decreases, resulting in an increase in precision of the direction detection in the controller 41.

Moreover, the post-processing unit 33 includes the three correction units 47, 49, and 51, but may be configured to adjust the sound quality with only the equalizer correction unit 47. In this case, circuit portions relating to the other delay correction unit 49 and level correction unit 51 are unnecessary.

Moreover, in the above-mentioned embodiment, the acoustic signals are input to the third speaker units 25 via the correction units 47, 49, and 51, but there may be adopted a configuration in which no correction processing is performed on the acoustic signals input to the third speaker units 25.

Moreover, the speaker device 10 may not include the third speaker units 25 for reproducing the low tone.

Moreover, there has been adopted the configuration in which the three correction units 47, 49, and 51 are achieved by executing corresponding programs by the DSP, but the correction units 47, 49, and 51 may be implemented in hardware including an arithmetic circuit and the like.

Moreover, in the above-mentioned embodiment, the acoustic signals in the same frequency band (intermediate frequency band or more) are input to the first and second speaker units 23 and 24, but the acoustic signals input the first and second speaker units 23 and 24 may not be the same in all the frequency band, but may have partially overlapping frequency bands.

Moreover, the orientation and the position in which the speaker device 10 is installed, which are illustrated in FIG. 1 and FIG. 2, are merely an example, and may be changed as appropriate. For example, the speaker device 10 may be installed in a state in which the first speaker units 23 face upward (ceiling side), and in which the second and third speaker units 24 and 25 face the listening position 210. In this case, the left and right positions of each of the speaker units 23 to 25 are reversed, and hence a circuit configured to switch acoustic signals input to the speaker units (such as first speaker unit 23L) on the left side and the speaker units (such as first speaker unit 23R) on the right side, and other such components may be included in the speaker device 10.

Moreover, the speaker device 10 does not need to be arranged along the wall 203, but may be arranged at a position separated from the wall 203 by a certain distance.

Moreover, the method of fixing the position of the speaker device 10 is merely an example, and in the case illustrated in FIG. 1, the speaker device 10 may be fixed to the wall 203 instead of being placed on the rack 15, for example.

Moreover, the signals input to the speaker device 10 are not limited to the 2.1 ch signals, but may be 2 ch stereo signals. In this case, the speaker device 10 may be configured to input the low frequency band, which cannot be reproduced by the first and second speaker units 23 and 24, to the third speaker units 25. Moreover, the signals input to the speaker device 10 may be multi-channel signals exceeding 2.1 ch. In this case, there may be adopted a configuration in which sounds in back and overhead surround channels are generated from a plurality of speakers installed in the front without installing speakers behind and above the listener 220, to thereby perform so-called "virtual surround reproduction". More specifically, the speaker device 10 may have a configuration including a localization addition processing unit, which is configured to localize signals in a back channel of the input acoustic signals to a virtual speaker position behind the listener 220, and a crosstalk canceling unit, which is configured to allow, of left output signals and right output signals of the acoustic signals, only the left output signals emitted from the speaker units to reach the left ear of the listener 220, and only the right output signals emitted from the speaker units to reach the right ear of the listener 220, for example.

Moreover, the number, shapes, positions, and the like of the components of the speaker device 10 in the above-mentioned embodiment are merely an example, and may be changed as appropriate. For example, the casing 21 has the rectangular parallelepiped shape extending in the left and right direction. However, the present invention is not limited thereto, and the shape may be changed as appropriate to another shape, for example, a rounded shape, an elliptical shape, or a curved shape.

A speaker device according to the technology disclosed in this application may include: a first light receiving element configured to output a first photocurrent in accordance with a received optical signal; a second light receiving element which is different in a set light receiving direction from the first light receiving element, and is configured to output a second photocurrent in accordance with a received optical signal; a cabinet to which the first and second light receiving elements are provided, the cabinet being installable in two states including a first state in which the light receiving direction of the first light receiving element is directed to an operation position and a second state in which the light receiving direction of the second light receiving element is directed to the operation position; and a control unit configured to detect whether the cabinet is in the first or second state in accordance with the first and second photo currents to carry out control based on the detection result.

The cabinet of this receiving device is installable in the difference states of the first state in which the light receiving direction of the first light receiving element is directed to the operation position and the second state in which the light receiving-direction of the second light receiving element is directed to the operation position. The control unit, is configured to detect the state of the cabinet, namely, the direction of the cabinet, in accordance with the first and second photocurrents output by the first and second light receiving elements. The optical signal received by the first and second light receiving elements is, for example, a signal from an infrared remote controller. A related-art speaker device includes a gravity detector, for example, a gyro sensor, for detecting the direction of a cabinet. The gyro sensor uses the Coriolis force or the like to detect the gravity direction, and thus requires an oscillation circuit configured to drive an electrode of the sensor and the like. In contrast, this receiving device uses the light receiving elements that do not require such a complex drive source to detect the direction of the cabinet, and thus it is expected that the structure of the overall device is simplified. Moreover, this receiving device can automatically detect the direction based on the first and second photocurrents, and thus a user does not need to intentionally perform operation for setting the direction of the receiving device and the like.

Moreover, the installation direction of the speaker device, for example, a sound bar, may be changed in accordance with a layout of a room. Further, receiving units for receiving the remote controller signal may be provided at a plurality of locations so that the remote controller operation may be available from the listening position even when the installation direction of the speaker device is changed, for example, when the device is hung on a wall or placed on a rack. This receiving device is excellent also in such a point that the plurality of receiving units originally provided for such a speaker device are efficiently used, thereby enabling the detection of the direction of the device without a gyro sensor or the like.

Moreover, the receiving device according to the technology disclosed in this application may include a voltage converting unit configured to convert the first and second photocurrents to voltages to output the voltages to the control unit, and the control unit may be configured to detect whether the receiving device is in the first or second state based on the voltages converted by the voltage converting unit.

In this receiving device, the control unit is configured to detect the state (direction) of the cabinet based on the voltages converted by the voltage converting unit. For example, it is assumed that the first and second light receiving elements are connected to a circuit configured to increase the first and second photocurrents in accordance with the received light amounts. In the first state, the operation position is arranged in the light receiving direction of the first light receiving element. On the other hand, the light receiving direction of the second light receiving element is set to a direction different from that toward the operation position. Then, when an operator operates the remote controller at the operation position to transmit the optical signal toward the receiving device, the received light amount of the first light receiving element is larger than the received light amount of the second light receiving element. In this case, the first photocurrent relatively increases. Therefore, the voltage converted by the voltage converting unit increases or decreases in accordance with the received light amount. In this receiving device, the state of the cabinet can be detected based on the voltage values that vary in accordance with the received light amounts.

Moreover, the receiving device according to the technology disclosed in this application may include a signal processing unit configured to receive signals corresponding to the first and second photocurrents input from the first and second light receiving elements to decode the signals to output results of the decode to the control unit.

The signal processing unit is configured to receive the first and second photocurrents output by the first and second light receiving elements, or voltages acquired by converting those photocurrents. The signal processing unit is configured to decode the input signal. For example, when an infrared ray is transmitted from a remote controller accompanying the receiving device to the first and second light receiving elements, the signal processing unit decodes a code signal contained in the infrared ray to output a result of the decode to the control unit. The receiving device can be installed on various devices the arrangement and the direction of which can be changed, for example, a speaker device, an illumination device, and a display device that can be operated by a remote controller. In this case, the control unit is configured to, for example, change a sound volume of a speaker unit, change brightness of an illumination device, and change a display of a monitor based on data (command from the remote controller) input from the signal processing unit.

In other words, the receiving device can use the same light receiving elements for detecting the direction of the cabinet and for receiving the command from the remote controller accompanying the device. Therefore, compared with a case in which light receiving elements are provided independently, simplification of the circuit configuration and the like are possible.

Moreover, in the receiving device according to the technology disclosed in this application, the control unit may be configured to stop the light receiving operation of the second light receiving element in response to such detection that the cabinet is in the first state in accordance with the first and second photocurrents.

In this receiving device, in the first state, that is, in the state in which the light receiving direction of the first light receiving element is directed to the operation position, the light receiving operation of the second light receiving element that does not face the operation position is considered to be unnecessary, and is thus stopped. For example, when the second light receiving element faces in a direction and is unlikely to receive a valid optical signal, for example, an operation instruction from the remote controller, the processing circuit including the second light receiving element is preferably stopped. This is because the stopping the processing circuit can decrease the power consumption and the like.

Moreover, in the receiving device according to the technology disclosed in this application, the control unit may be configured to carry out control based on the detection result when a power of the receiving device is turned on.

There are various devices in which the control contents need to be changed in accordance with the installation direction (direction) of the device. For example, in the speaker device, when the direction of the device is changed, the sound emission directions of speaker units are changed with respect to the listening position. Therefore, when the direction of the speaker device is changed, processing, for example, sound quality adjustment in accordance with the direction, needs to be carried out. This receiving device is configured to change the control contents in accordance with the direction of the device when the power is turned on, thereby enabling more quick application of the control optimized for the direction of the device.

Moreover, a speaker device according to the technology disclosed in this application may include: the above-mentioned receiving device; a first speaker unit configured to emit sound in accordance with an acoustic signal that is input thereto; and a second speaker unit that has a sound emission direction different from that of the first speaker unit and a large diameter as compared to the first speaker unit, and is configured to receive an acoustic signal including a frequency band of the acoustic signal input to the first speaker unit, in which the cabinet may be configured such that, the sound emission direction of the first speaker unit may be directed to a listening position in the first state, and the sound emission direction of the second speaker unit may be directed to the listening position in the second state, and the control unit may be configured to carry out processing of correcting frequency characteristics of acoustic signals input to the first and second speaker units based on a detection result.

The speaker device includes the first and second speaker units different in the diameter and the sound emission direction from each other. The speaker device can direct the sound emission direction of any one of the first and second speaker units to the listening position by changing the direction of the cabinet. The control unit is configured to detect the state of the cabinet based on the first and second photocurrents of the first and second light receiving elements, and correct the frequency characteristics of the acoustic signals input to the first and second speaker units based on a detection result. The control unit is configured to change the frequency characteristics so as to correct variations in the sound quality at the listening position caused by a difference in the diameter and a difference in the sound emission direction between the first and second speaker units. More specifically, the first and second speaker units are different in the diameter from each other, and are thus different in an advantageous reproduction band from each other. In general, the first speaker unit small in the diameter is advantageous in the reproduction in a high frequency band compared to the second speaker unit larger in the diameter. Therefore, in the first state in which the sound emission direction of the first speaker unit is directed to the listening position, the effects of the sound in the high frequency band of the first speaker unit is great for the listener. In the speaker device, acoustic signals overlapping in frequency bands are input to the first and second speaker units. Thus, for example, in the first state, the control unit changes the frequency characteristics so that sound in an intermediate frequency band, which is not advantageous for the first speaker unit, is emphasized out of the frequency bands of the sound reproduced from the second speaker unit whose sound emission direction is set to a direction different from that toward the listening direction. As a result, variations in the sound quality at the listening position caused by the change in the direction of the installation of the speaker device can be suppressed.

According to the technology disclosed in this application, there can be provided a receiving device including a cabinet whose direction is changed in accordance with an installation state, and being capable of detecting the direction of the device based on optical signals received by a plurality of light receiving elements, and a speaker device including the receiving device.

What is claimed is:

1. A speaker device, comprising:
    a cabinet having a first surface and a second surface, the first surface being different from the second surface;
    a first speaker unit provided at the first surface, the first speaker unit configured to emit a first sound in accordance with a first acoustic signal that is input to the first speaker unit;
    a second speaker unit provided at the second surface, the second speaker unit configured to emit a second sound in accordance with a second acoustic signal that is input to the second speaker unit and the second sound has a sound emission direction different from a sound emission direction of the first sound of the first speaker unit;
    a first light receiver provided at the first surface and a second light receiver provided at the second surface, the first light receiver being different from the second light receiver, wherein the first light receiver and the second light receiver are configured to simultaneously receive an optical signal from a remote controller at a listening position, and the first receiver outputs a first signal in accordance with the received optical signal and/or the second light receiver outputs a second signal in accordance with the received optical signal; and
    a control unit configured to:
        determine whether the speaker device is in a first installed state or a second installed state based at least in part on the first signal and/or the second signal, and
        perform processing on the first acoustic signal and the second acoustic signal based on whether the speaker device is in the first installed state or the second installed state.

2. The speaker device according to claim 1, wherein the first signal is a first photocurrent, and wherein the second signal is a second photocurrent.

3. The speaker device according to claim 2, further comprising a voltage converting unit configured to convert the first photocurrent and the second photocurrent to voltages and output the voltages to the control unit,
    wherein the control unit is configured to detect whether the cabinet is in the first state or the second state based on the voltages from the voltage converting unit.

4. The speaker device according to claim 1, wherein one or more of: (i) the first optical signal and (ii) the second optical signal is from a remote controller.

5. The speaker device according to claim 3, further comprising a signal processing unit configured to receive and decode the first and second signals,
    wherein the control unit is configured to detect whether the cabinet is in the first state or the second state based on whether or not the decoded signal has a valid value.

6. The speaker device according to claim 1, wherein the control unit is configured to stop a light receiving operation of the second light receiver in response to a detection that the cabinet is in the first state in accordance with the first photocurrent and the second photocurrent.

7. The speaker device according to claim 1, wherein the control unit is configured to perform control based on the detection result when the speaker device is turned on.

8. The speaker device according to claim 1, wherein the first light receiver and the second light receiver are provided independently of a light receiving element configured to receive an optical signal from a remote controller.

9. The speaker device according to claim 1, wherein the second speaker unit has a large diameter as compared to the first speaker unit.

* * * * *